Feb. 23, 1965 G. R. BENZ ETAL 3,170,484
VALVE SYSTEM
Filed June 20, 1962 2 Sheets-Sheet 1
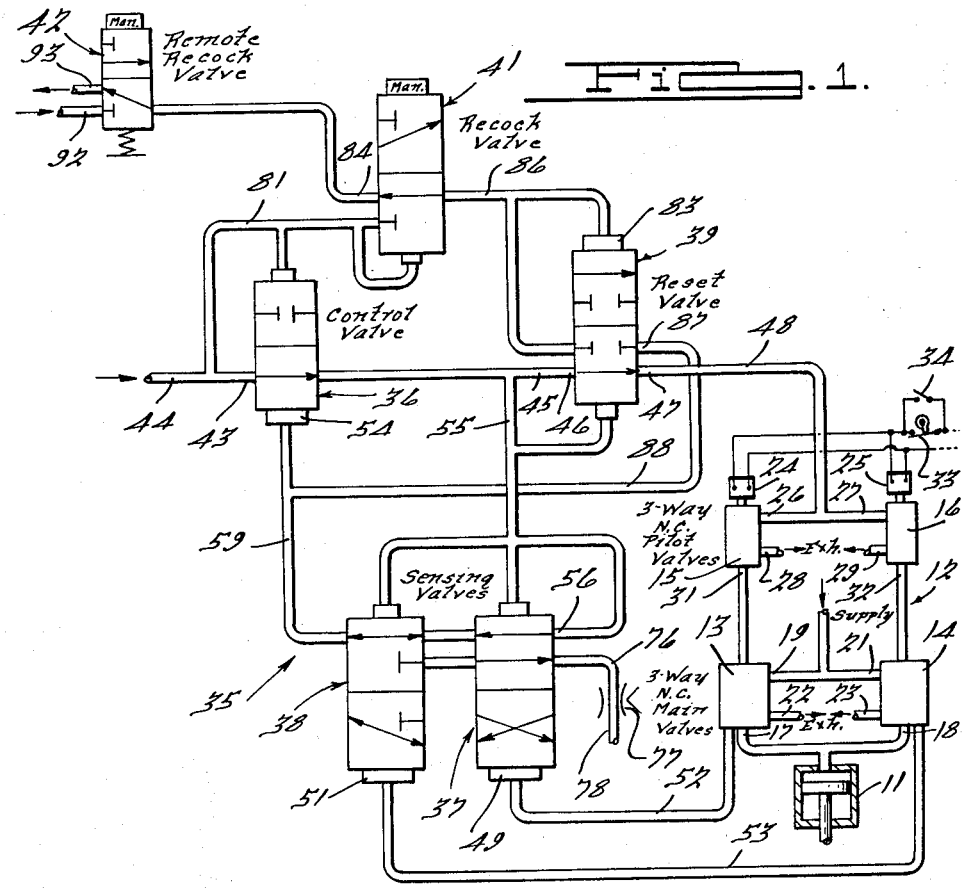
FIG. 1.
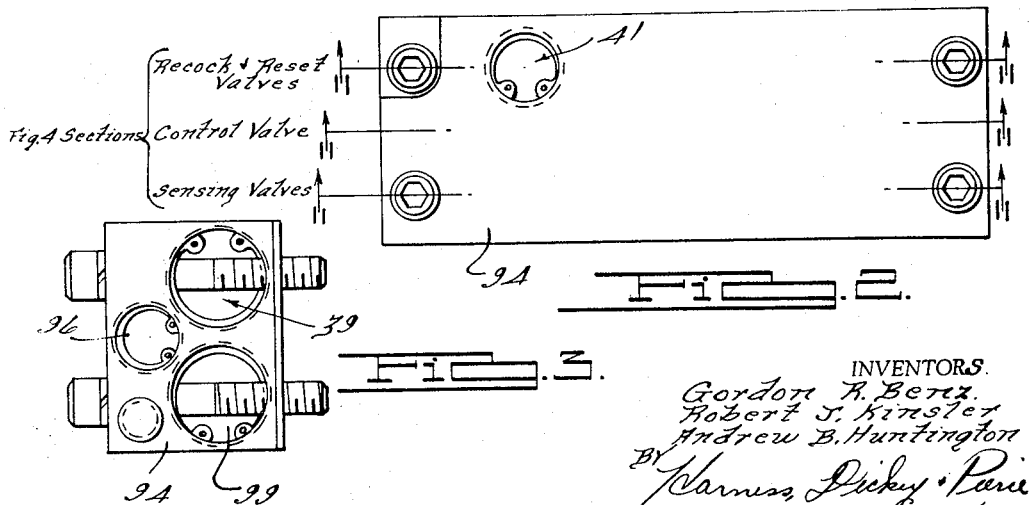
FIG. 2.
FIG. 3.
INVENTORS.
Gordon R. Benz.
Robert J. Kinsler
Andrew B. Huntington
BY Harness, Dickey & Pierce
ATTORNEYS

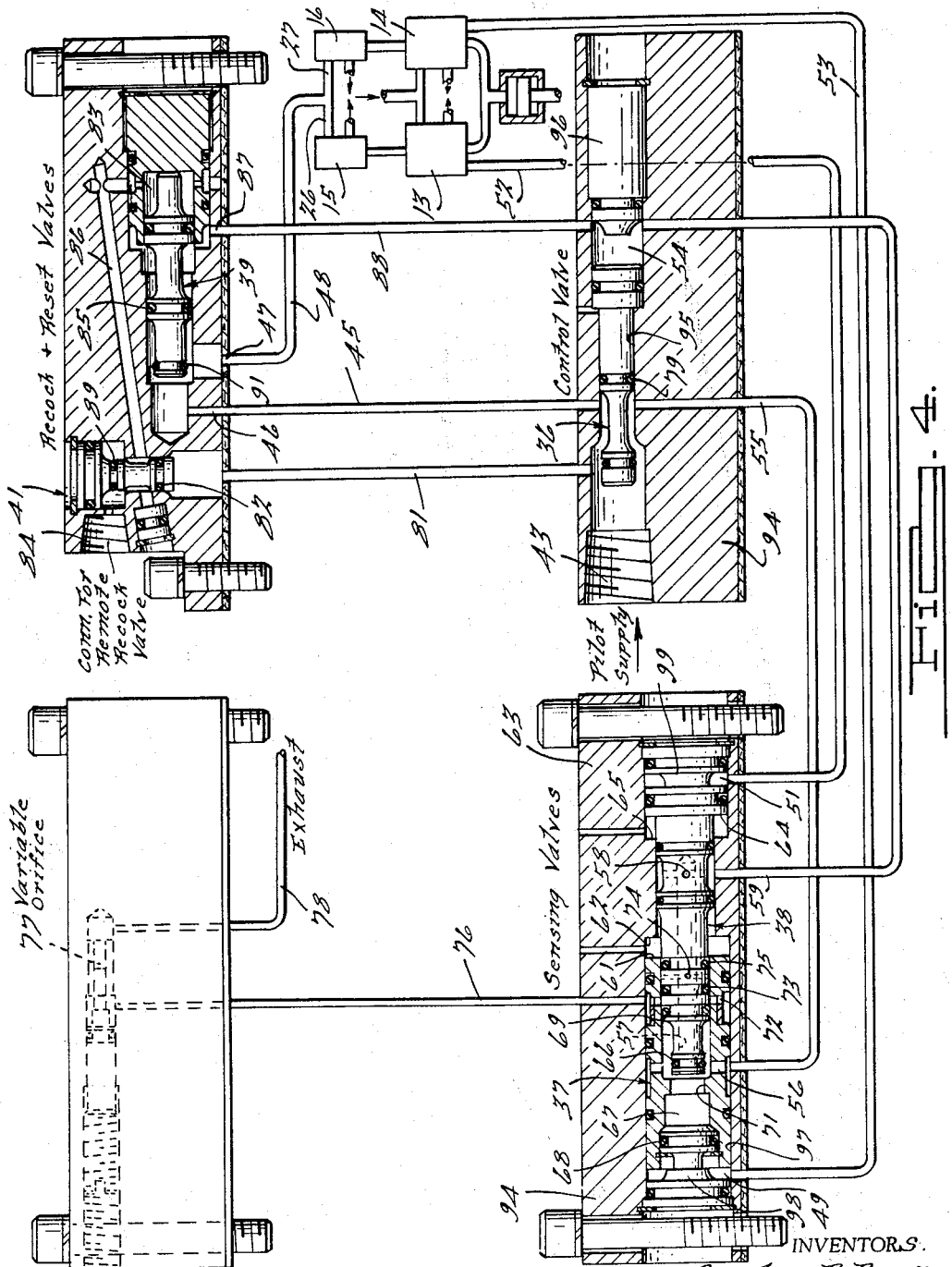

United States Patent Office 3,170,484
Patented Feb. 23, 1965

3,170,484
VALVE SYSTEM
Gordon R. Benz, Detroit, Robert J. Kinsler, Harper Woods, and Andrew B. Huntington, Royal Oak, Mich., assignors to Ross Operating Valve Company, Detroit, Mich., a corporation of Michigan
Filed June 20, 1962, Ser. No. 203,885
13 Claims. (Cl. 137—596.16)

This invention relates to valve systems, and more particularly to safety systems for disenabling a fluid motor in response to the malfunction of a portion of the fluid control circuit for the motor.

The invention has particular application to fluid motor control circuits in which two simultaneously occurring valve actions are utilized for motor control, and in which a discrepancy between such valve actions is sensed in order to disenable the main or pilot valves in the motor control circuit, either by cutting off the supply to the working chambers of such valves or by also venting the working chambers. Such a system is shown, for example, in Di Tirro et al. Patent No. 2,906,246, issued September 29, 1959.

It is an object of the present invention to provide a novel and improved system of this type which includes means for preventing the system from being disenabled for minor reasons such as slight variables in the electrical supply system for the pilot valve solenoids or in the times of movement of the various motor system parts, the invention permitting the preselection of a desired allowable asynchronism of the sensed conditions.

It is another object to provide an improved valve system of this character in which the safety or control element is fluid-locked rather than mechanically locked in its disenabling position, thus decreasing system wear.

It is also an object to provide an improved valve system of this nature in which resetting of a disenabled control system is prevented if no fluid pressure input is available.

It is another object to provide a novel and improved safety control system having the above characteristics, in which it is impossible to restore a disenabled fluid motor control system to operative condition without deliberate actuation of the resetting element, thus preventing the safety control function from being circumvented by "tying down" the resetting element.

It is a further object to provide an improved valve system of this character in which the safety element is movable in only one direction from its normal to its disenabling position, thus minimizing shifting resistance and permitting the use of a relatively simple safety mechanism.

It is also an object to provide an improved valve system of this character in which the loss and subsequent reestablishment of inlet pressure will not affect the safety control functions of the unit, regardless of whether this temporary pressure loss occurs when the device is in its normal or in its disenabling position.

Other objects, features, and advantages of the present invention will become apparent from the subsequent description, taken in conjunction with the accompanying drawings, in which:

FIGURE 1 is a schematic fluid circuit diagram of the invention applied to the pilot valve supply for a fluid motor control system having a pair of main valves operating in parallel, with the sensing means being pressure-responsive to corresponding points in the main valves;

FIGURE 2 is a side elevational view of a suitable unit construction incorporating the various elements of the safety control system;

FIGURE 3 is an end elevational view of the unit of FIGURE 2; and

FIGURE 4 is a partially schematic view of the novel valve system using a bottom plan view of the unit of FIGURE 2, together with three sectional views from FIGURE 2 showing the recock and reset valves, control valve and sensing valves, respectively, the sections and plan view being connected by schematically shown fluid conduits and shown in conjunction with the motor control circuit.

Briefly, the illustrated embodiment of the invention is shown in conjunction with a fluid motor control system which has a pair of 3-way main valves operating in parallel and controlled by a pair of 3-way pilot valves. The safety system is used to cut off supply pressure to the pilot valves upon the sensing of a pressure differential between corresponding points in the main valves such as would occur if the main valves had discrepant positions.

The safety system includes a control valve having a normal position permitting fluid flow to the pilot valve supply and a disenabling position cutting off such flow. The control valve is held in its normal position by fluid pressure supplied through itself, and also through a pair of sensing valves connected in series, to a chamber. These sensing valves are each simultaneously shiftable with one of the two main valves, the latter of course being simultaneously shiftable with each other, or nearly so, when the motor control system is operating normally. As long as the two sensing valves shift at about the same time, they will maintain pressure on the control valve to hold the latter in its normal position.

However, should one of the main valves shift without the other, the corresponding sensing valve will also shift while the other sensing valve remains stationary. This will cause the pressure in the chamber holding the control valve in its normal position to be vented. The vent connection passes through a variable restriction, so that discrepancies of minor duration will not affect the control valve position. However, should the discrepancy continue beyond a predetermined time, the control valve will shift to its disenabling position, cutting off supply pressure to the pilot valves and at the same time cutting off supply pressure to the chamber which had previously held the control valve in its normal position.

Assuming that the pilot and main valves are both normally closed 3-way valves, and that the motor control system is periodically cycled between its positions, cutting off the pilot valve supply will have the effect of holding both pilot and main valves in their closed, that is, exhaust positions when the pilot valves are next cycled to their exhaust positions. The fluid motor would thus be stopped in a safety condition until the trouble could be ascertained and proper action taken to remedy it.

The pilot supply fluid leading from the control valve passes through a normally open reset valve. After the system has been repaired and it is desired to reset the control valve to its normal position, the reset valve will be reciprocated from its normally open position to its reset position in which the connection between the control valve and the pilot supply is cut off but pressure is applied to the control valve chamber which shifts it back to its normal position. This will cause application of pressure to chambers associated with the sensing valves to move them to a position reapplying pressure to the control valve chamber. Upon restoration of the reset valve to its normal position, pilot supply pressure will be applied to the pilot valves.

The reset valve is shown as controlled by a recock valve which has a normal position connecting a chamber adjacent the reset valve to exhaust, and a recocking position pressurizing this chamber so as to shift the reset valve to its resetting position. When in its recocking position, the recock valve will also supply pressure to the reset valve which may be passed on to the control valve chamber to urge the control valve to its normal position. The recock valve may be manually controlled, or alternatively, a remote recock valve may be provided in the form of a manually actuatable normally closed 3-way valve.

Referring more particularly to the drawings, a fluid motor is indicated at 11 and is controlled by a control system generally indicated at 12. Motor 11 may be of the type used to operate a clutch or brake of a press or similar apparatus in an industrial establishment, system 12 being cyclically operated, for example, in accordance with the position of the press.

System 12 comprises a pair of 3-way normally closed main valves 13 and 14 controlled by a pair of normally closed 3-way pilot valves 15 and 16, respectively. The working or outlet ports 17 and 18 of main valves 13 and 14, respectively, are connected in parallel to one side of motor 11, the main valves having supply ports 19 and 21 and exhaust ports 22 and 23, respectively.

Pilot valves 15 and 16 are controlled by solenoids 24 and 25, respectively, and have supply ports 26 and 27, exhaust ports 28 and 29, and working or outlet ports 31 and 32 connected to the activating chambers of valves 13 and 14, respectively. When solenoids 24 and 25 are de-energized, supply ports 26 and 27 will be shut off and outlet ports 31 and 32 will be connected to exhaust ports 28 and 29, respectively. Main valves 13 and 14 will thus be in their normally closed position, with outlet ports 17 and 18 connected to exhaust ports 22 and 23, respectively, supply ports 19 and 21 being shut off. Upon energization of solenoids 24 and 25, pilot valves 15 and 16 will be moved to their open position, pressurizing ports 31 and 32 and shifting main valves 13 and 14 to their open positions. This will pressurize ports 17 and 18 and cause shifting of motor 11. If motor 11 is used to actuate a clutch for a machine such as a press, a cam-operated switch 33 may be provided in the circuit for solenoids 24 and 25 which will be opened when the press completes a cycle, thus de-energizing the solenoids and causing the pilot and main valves to move to their exhaust positions, which opens the clutch and stops the press. A manually operated switch 34 is shown for bypassing switch 33 to start another press cycle.

The parallel valve motor supply system just described is well-known and can function to prevent actuation of motor 11 should one main valve fail to function properly. Thus, if valve 13 stays in its exhaust position when valve 14 moves to its supply position, the fluid supply to motor 11 from valve 14 will be at least partially removed through the exhaust port 22 of valve 13, assuming that the ports are properly proportioned.

The novel safety system of this invention is generally indicated at 35 and comprises a control valve generally indicated at 36, a pair of sensing valves generally indicated at 37 and 38, a reset valve generally indicated at 39, a recock valve generally indicated at 41 and a remote recock valve generally indicated at 42 which may be actuated instead of recock valve 41. These elements are indicated by like reference numerals in FIGURES 1 and 4.

Control valve 36 comprises a 2-position differential pressure operated 2-way valve movable between a normal position as shown in FIGURES 1 and 4 and a disenabling position. When in its normal position, its supply port 43, connected to a source of constant fluid pressure 44, is connected through a conduit 45 to a port 46 of reset valve 39.

The reset valve is a 2-position differential pressure operated dual 2-way valve having a normal position as shown in FIGURES 1 and 4 in which port 46 is connected to a port 47 connected by a conduit 48 to inlet ports 26 and 27 of pilot valves 15 and 16, respectively.

Sensing valves 37 and 38 together form a differential pressure operated selector valve having four physical positions and three functional positions whose two signal pressures, at chambers 49 and 51, respectively, are provided by the operation of the two main valves 13 and 14 through conduits 52 and 53. As indicated previously, these conduits are connected to corresponding points in the two main valves so as to be responsive to any discrepant positions between the valves. As main valves 13 and 14 shift between their supply and exhaust positions, chambers 49 and 51 will be alternately pressurized and exhausted. When chambers 49 and 51 are exhausted, valves 37 and 38 will occupy the positions shown in FIGURES 1 and 4. When in these positions, pressure will be supplied to pressure-responsive means comprising a piston chamber 54 at control valve 36 to maintain the control valve in its normal position. The path of this fluid pressure will be through a conduit 55 leading from control valve 36 through a port 56 in valve 37, through axial passage 57 in valve 38, radial passages 58 and conduit 59 to chamber 54.

Pressurization of chambers 49 and 51 will cause valves 37 and 38, which comprise outer and inner spools reciprocable toward and away from each other, to move into further telescoping relation until shoulder 61 of spool 37 engages shoulder 62 of housing 63, and shoulder 64 of spool 38 engages housing shoulder 65. When in this position, valve seal 66 carried by spool 38 will move into chamber 67, and pressure will still be maintained in chamber 54, the pressure passing from port 56 into chamber 67, then through passages 57, 58 to conduit 59.

Should valves 13 and 14 assume discrepant positions, one of the two chambers 49 and 51 will be pressurized and the other exhausted. Assuming that chamber 49 is pressurized, valve 37 will move to the right in FIGURE 4 while valve 38 remains stationary. It should be noted that the pressure from conduit 55 will normally tend to hold valve 37 to the left in FIGURE 4 and valve 38 to the right by virtue of its acting on seal 68 of valve 37 and seal 69 of valve 38. When valve 37 shifts to the right while valve 38 remains in the FIGURE 4 position, seal 66 will engage shoulder 71 and cut off pressure from port 56 to passage 57. At the same time, radial ports 72 on valve 37 will move past seal 73 into alignment with radial ports 74 leading from passage 57; these ports are normally sealed off by seals 73 and 75. Ports 72 are connected to a conduit 76 leading to a variable restriction 77, the outlet of this variable restriction being connected to atmosphere by a conduit 78. Chamber 54 of control valve 36 will therefore be exhausted at a rate depending upon the setting of restriction 77.

Since the supply pressure at port 43 acts upon a seal 79 of valve 36, depletion of pressure in chamber 54 will shift valve 36 to the right in FIGURE 4, shutting off the connection to conduit 45.

Recock valve 41 is a 2-position manually operated pressure returned 3-way normally closed valve. Valve 41 is supplied with pressure by a conduit 81 leading from port 43, this pressure acting against a seal 82 to hold the valve in its normal position. In this position, a chamber 83 of reset valve 39 is connected to an exhaust port 84 so that the pressure at port 46 acting on seal 85 of the reset valve will hold the reset valve in its normal position as shown in FIGURE 4. Upon depression of recock valve 41, the conduit 86 leading from the recock valve to chamber 83 will be connected to pressure from conduit 81. This will shift reset valve 39 to the left in FIGURE 4, that is, to its reset position.

When in its reset position, reset valve 39 will cut off the connection between ports 46 and 47 but will open a connection between chamber 83 and a port 87 leading by means of a conduit 88 to chamber 54 of control valve 36. Conduit 88 acts as a bypass connection for supplying pressure to chamber 54 even though connection 59 has been closed by sensing valves 37 and 38. This will cause the control valve to shift back to its normal position, but fluid pressure will still not be supplied to pilot valve supply ports 26 and 27 because of the cutoff between ports 46 and 47.

Upon release of manual pressure on recock valve 41, the pressure acting on seal 89 thereof will move the recock valve upwardly in FIGURE 4 to its normal position as shown in that figure. This will exhaust chamber 83 so that the pressure from port 46 acting on seal 91 of reset valve 39 will shift the reset valve into its normal position as shown in FIGURE 4. Since pressure at chamber 54 will be maintained through sensing valves 37 and 38, through a circuit described in detail below, the return of valve 39 to its normal position will permit pressure to be applied to pilot ports 26 and 27.

Remote recock valve 42 is a normally closed 3-way valve which may be located at some distance from the other portions of system 35. Valve 42 is manually movable from a normal position as shown in FIGURE 1 to an open position in which a source of supply pressure 92 is connected to port 84 of valve 41. This pressure will be transmitted through conduit 86 to chamber 83, and the resulting action will be the same as if recock valve 41 had been depressed. Removal of manual pressure on remote recock valve 42 will return it to its exhaust position, relieving pressure in chamber 83 through an exhaust port 93.

FIGURES 2 and 3 show a unitary housing 94 for valves 36, 37, 38, 39 and 41 as well as variable orifice 77. FIGURE 4 includes sections taken from FIGURE 2 to show the various valves. Control valve 36 is disposed within a bore 95 in housing 94, and a stop 96 is mounted within one end of bore 95 to define the closed position of valve 36. A bore 97 is formed in housing 94 for sensing valves 37 and 38, a pair of stops 98 and 99 being mounted in bore 97 for valves 37 and 38, respectively.

In operation, assuming an initial condition with the parts of the system as shown in FIGURE 1, closure of switch 34 will cause energization of solenoids 24 and 25, shifting pilot valves 15 and 16 to their supply positions. This will cause shifting of main valves 13 and 14 to their supply positions and operation of motor 11. Assuming that motor 11 engages a press clutch, initiation of the press cycle will cause cam-operated switch 33 to close, maintaining energization of the solenoids through the press cycle. Valves 37 and 38 will shift simultaneously to their upper positions as seen in FIGURE 1 (to the left and right, respectively, in FIGURE 4), maintaining pressure at control valve chamber 54. (This assumes, of course, that conduits 52 and 53 are connected to portions of valves 13 and 14 which will become pressurized when these valves move to their supply positions. If the opposite is true, valves 37 and 38 will initially be in their upper positions and will move to their lower positions in FIGURE 1, with the same result.) When the press has completed its cycle, switch 33 will open, and pilot valves 15 and 16 will shift to their exhaust position, causing main valves 13 and 14 to shift to their exhaust position, thus again shifting motor 11 to its initial position which will disengage the clutch and stop the press cycle. Valves 37 and 38 will also shift to their initial positions, maintaining pressure at control valve chamber 54.

Should asynchronism develop between the main valves, one or the other of sensing valves 37 and 38 will shift when the other remains stationary. This will cause venting of chamber 54 through orifice 77. If the asynchronism continues beyond a predetermined time limit, as selected by the setting of orifice 77, valve 36 will shift to its closed or safety position, cutting off supply pressure to pilot valves 15 and 16.

Assuming that sufficient pressure remains at these supply ports to maintain the pilot valves and main valves in their supply positions, motor 11 will remain in its activated position until switch 33 is opened by completion of the machine cycle. De-energization of solenoids 24 and 25 will then shift the pilot and main valves to their exhaust positions, and motor control system 12 will thereafter be disenabled.

After the cause of the asynchronism has been corrected, recock valve 41 (or remote recock valve 42) may be depressed. This will cause reset valve 39 to shift to its lower position in FIGURE 1, applying pressure to chamber 54 and resetting control valve 36 to its normal position, reset valve 39 meanwhile maintaining the cutoff condition of pilot valve supply ports 26 and 27. Opening of control valve 36, however, will cause sensing valves 37 and 38 to shift from whatever position they may have previously been in to the positions shown in FIGURES 1 and 4. Pressure will thus also be supplied to control valve chamber 54 through sensing valves 37 and 38.

Upon release of recock valve 41, reset valve 39 will return to its normal position, reapplying pressure to pilot valve supply ports 26 and 27. Fluid control system 12 will thus be re-enabled for activation of motor 11.

Because of the presence of variable orifice 77, undesired shifting of control valve 36 to its disenabling position, due to such causes as minor variables in the electrical supply system or in the time of movement of the pilot and main valves, may be prevented. It should also be observed that control valve 36 may not be reset to its normal position if, for some reason, no pressure input is available at supply source 44. Operation of the safety system cannot be circumvented by "tying down" recock valve 41 or remote recock valve 42, since this would prevent reset valve 39 from returning to its normal position. If control valve 36 has been shifted to its disenabling position, loss of inlet pressure at source 44 and subsequent re-establishment of this pressure will not return safety system 35 to its normal condition, and if control valve 36 is in its normal position, loss and subsequent re-establishment of inlet pressure will not change this position. The system thus includes a "memory" feature which will prevent malfunction in the event of a temporary pressure loss.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. In a safety system for use in conjunction with a fluid motor control system of the type having a pair of synchronously operable valves, a control member movable between a normal position and a safety position disenabling said synchronously operable valves, sensing means shiftable from a normal position to a disenabling position in response to the occurrence of discrepant positions between said valves, and means responsive to the expiration of a predetermined time after shifting of said sensing means to its disenabling position for causing said control member to shift to its safety position.

2. In a safety system for use in conjunction with a fluid motor control system of the type having a pair of synchronously operable valves, a control member movable between a normal position and a safety position disenabling said synchronously operable valves, sensing means shiftable from a normal position to a disenabling position in response to the occurrence of discrepant positions between said valves, means responsive to the expiration of a predetermined time after shifting of said sensing means to its disenabling position for causing said control member to shift to its safety position, a resetting member movable between a normal position and a reset position, and means responsive to movement of said reset member to its reset position for shifting said control member to its normal position but disenabling said synchronously operable valves independently of said control member.

3. In a safety system for use in conjunction with a fluid motor control system of the type having a pair of synchronously operable valves, pilot valve means connected to said synchronously operable valves and movable to shift said synchronously operable valves, a control valve operable from said pilot valve means and synchronously operable valves and movable between a normal position and a safety position disenabling said synchronously operable valves, and sensing means movable separately from said control valve in response to an asynchronous condition between said pair of valves to a position causing said control valve to shift to its disenabling position.

4. In a safety system for use in conjunction with a fluid motor control system of the type having a pair of synchronously operable valves, a supply connection for said valves, a control valve movable between a normal position permitting uninterrupted flow to said supply ports and a disenabling position cutting off said flow, pressure-responsive means for maintaining said control valve in its normal position, and sensing valve means responsive to a discrepant position between said pair of valves for relieving pressure at said pressure-responsive means and permitting said control valve to shift to its disenabling position.

5. In a safety system for use in conjunction with a fluid motor control system of the type having a pair of synchronously operable valves, a control valve movable between a normal position and a safety position disenabling said synchronously operable valves, pressure-responsive means for maintaining said control valve in its normal position, and a pair of sensing valves simultaneously operable between first and second normal positions in response to synchronous operation of said pair of synchronously operable valves for maintaining pressure at said pressure-responsive means, said pair of sensing valves also being movable, in response to an asynchronous condition between said pair of synchronously operable valves, to either a first or a second disenabling position relieving pressure at said pressure-responsive means and permitting said control valve to move to its disenabling position.

6. In a safety system for use in conjunction with a fluid motor control system of the type having a pair of synchronously operable valves, a control valve having an outlet, a supply port connection from said outlet to said pair of valves, said control valve being movable between a normal position permitting supply pressure flow to said supply port connection and a disenabling position cutting off said supply pressure flow, pressure-responsive means for maintaining said control valve in its normal position, a connection from the outlet of said control valve to said pressure-responsive means, whereby movement of said control valve to its disenabling position will cut off pressure supply to said pressure-responsive means, sensing valve means responsive to an asynchronous condition between said pair of valves for venting said pressure-responsive means and permitting said control valve to move to its disenabling position, a fluid pressure connection to said pressure-responsive means bypassing said first-mentioned connection to said pressure-responsive means, and a reset valve movable between a normal position in which said supply port connection is open and said bypass connection is closed, and a reset position in which said supply port connection is closed and said bypass connection is open.

7. In a safety system for use in conjunction with a fluid motor control system of the type having a pair of synchronously operable valves, a control valve movable between a normal position permitting uninterrupted flow to the supply ports of said synchronously operable valves and a disenabling position cutting off said flow, pressure-responsive means for urging said control valve toward its normal position, a vent, sensing valve means responsive to an asynchronous condition between said pair of valves for connecting said pressure-responsive means to said vent, and a variable orifice in said vent for controlling the rate of pressure depletion at said pressure-responsive means.

8. In a safety system for use in conjunction with a fluid motor control system of the type having a pair of synchronously operable valves, a source of supply pressure, supply ports for said synchronously operable valves, a control valve movable between a normal position permitting uninterrupted flow from said source to said supply ports and a safety position cutting off said flow, pressure-responsive means for holding said control valve in its normal position, a connection from the outlet of said control valve to said pressure-responsive means, a pair of sensing valves in said connection, said sensing valves being simultaneously movable between first and second normal positions permitting uninterrupted flow through said connection in response to synchronous operation of said pair of valves and movable to either first or second disenabling positions cutting off flow through said connection in response to an asynchronous condition between said pair of valves, a vent, means in said sensing valves when in their first or second disenabling positions connecting said pressure-responsive means to said vent, a variable orifice in said vent for controlling the rate of pressure depletion from said pressure-responsive means, a second source of fluid pressure independent of said first source, a connection from said second pressure source to said pressure-responsive means bypassing said connection from the control valve outlet to said pressure-responsive means, and a reset valve movable between a normal position permitting uninterrupted flow from said control valve outlet to said supply ports but closing said bypass connection and a reset position closing said connection between the control valve outlet and supply ports but opening said bypass connection.

9. The combination according to claim 8, further provided with means for urging said reset valve toward its normal position, pressure-responsive means for urging said reset valve toward its reset position, and a recock valve movable between a first position venting and a second position pressurizing said last-mentioned pressure-responsive means.

10. In a safety system for use in conjunction with a fluid motor control system of the type having a pair of synchronously operable valves with parallel outlet connections to a motor, a control valve movable between a normal position and a disenabling position with respect to said synchronously operable valves, a pair of sensing valves comprising inner and outer spools in telescopic relation, each spool being movable from a first position to a second position in a direction toward the other spool, first relatively small pressure areas on said spools responsive to fluid pressure for urging the spools toward their first positions, second relatively large pressure areas on said spools responsive to fluid pressure for moving the spools toward their second positions, a first pressure sensing connection from one of said pair of valves to the larger pressure area of one spool, a second pressure sensing connection from the second of said pair of valves to the larger pressure area of the other spool, said pressure sensing connections being at corresponding points in said pair of valves, a piston chamber for holding said control valve in its normal position, a pressure connection from the outlet of said control valve to said last-mentioned piston chamber, means forming part of said sensing valves when they are both in their first or second positions for opening said last-mentioned connection, and means forming part of said sensing valves when either is in its first position and the other is in its second position for closing said last-mentioned connection.

11. The combination according to claim 10, further provided with a vent, a connection between said control valve piston chamber and said vent, means forming part of said sensing valves when they are both in their first or second positions for closing said last-mentioned connection, and means forming part of said sensing valves when one sensing valve is in its first position and the other is in its second position for opening said last-mentioned connection.

12. In combination, a fluid motor control system having a pair of 3-way normally closed main valves with parallel outlet connections for a fluid motor, a pair of 3-way normally closed pilot valves for operating said main valves, supply ports for said pilot valves, a source of fluid pressure for said supply ports, a connection between said source and said supply ports, a control valve in said connection movable between a normal position opening said connection and a disenabling position closing said connection, a piston chamber for urging said control valve toward its normal position, a connection between the outlet of said control valve and said piston chamber, a vent, a pair of sensing valves each movable between a first and a second position, means normally urging said sensing valves toward their first positions, sensing connections from said main valves to said sensing valves and responsive to pressure to move said sensing valves toward their second positions, said sensing valves when both in their first or second positions opening said connection between the control valve outlet and the control valve piston chamber but cutting off said control valve piston chamber from said vent, and means in said sensing valves when either is in its first position and the other is in its second position for cutting off the connection between the control valve outlet and said control valve piston chamber and connecting said control valve piston chamber to said vent.

13. The combination according to claim 12, further provided with a second pressure source independent of said first source, a bypass connection between said second pressure source and said control valve piston chamber, and a reset valve movable between a first position connecting said control valve outlet and said pilot valve supply ports but closing said bypass connection, and a second position opening said bypass connection and closing the connection between said control valve outlet and said pilot valve supply ports.

References Cited in the file of this patent
UNITED STATES PATENTS 3,068,897   Ruchser _____ Dec. 18, 1962

UNITED STATES PATENT OFFICE
CERTIFICATE OF CORRECTION

Patent No. 3,170,484                      February 23, 1965

Gordon R. Benz et al.

It is hereby certified that error appears in the above numbered patent requiring correction and that the said Letters Patent should read as corrected below.

Column 7, line 8, for "operable" read -- separate --.

Signed and sealed this 27th day of July 1965.

(SEAL)
Attest:

ERNEST W. SWIDER                      EDWARD J. BRENNER
Attesting Officer                      Commissioner of Patents